(12) United States Patent
Kulik et al.

(10) Patent No.: US 8,022,355 B2
(45) Date of Patent: Sep. 20, 2011

(54) SCINTILLATION DETECTOR GAIN CONTROL SYSTEM USING REFERENCE RADIATION

(75) Inventors: Alex Kulik, Sugar Land, TX (US); Alexander Joseph Esin, Sugar Land, TX (US); Nikolay Baturin, Sugar Land, TX (US)

(73) Assignee: Thermo Fisher Scientific Inc., Sugar Land, TX (US)

( * ) Notice: Subject to any disclaimer, the term of this patent is extended or adjusted under 35 U.S.C. 154(b) by 176 days.

(21) Appl. No.: 12/535,551

(22) Filed: Aug. 4, 2009

(65) Prior Publication Data

US 2011/0031405 A1 Feb. 10, 2011

(51) Int. Cl.
*G01T 1/20* (2006.01)
(52) U.S. Cl. .................................... 250/252.1
(58) Field of Classification Search ............... 250/252.1
See application file for complete search history.

(56) References Cited

U.S. PATENT DOCUMENTS 3,922,541 A * 11/1975 Seeman ................ 250/256
5,600,135 A * 2/1997 Jacobson ................ 250/261

OTHER PUBLICATIONS

Combined Search and Examination Report for British Application No. GB1012999.7 mailed Mar. 31, 2011 (6 pages).

* cited by examiner

*Primary Examiner* — Constantine Hannaher
(74) *Attorney, Agent, or Firm* — Osha • Liang LLP

(57) ABSTRACT

A method for controlling gain of a scintillation detector includes using a reference radiation source and a photomultiplier tube and controlling the gain of the scintillation detector based on the reference radiation source. The controlling includes detecting change in the gain of the scintillation detector, determining an amount of the change in the gain, outputting a control signal to compensate the amount of the change in the gain, and stabilizing the gain against the reference radiation source based on the control signal. A gain control system for controlling gain of a scintillation detector includes computer-readable instructions stored in the memory for causing the processor to detect change in the gain of the scintillation detector determine an amount of the change in the gain, output a control signal to compensate the amount of the change in the gain, and stabilize the gain against the reference radiation source based on the control signal.

22 Claims, 5 Drawing Sheets

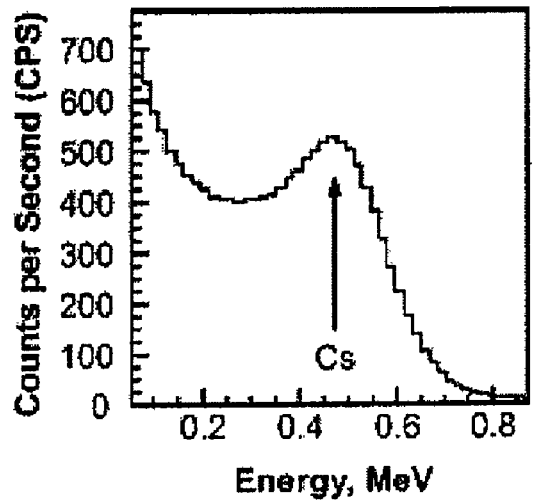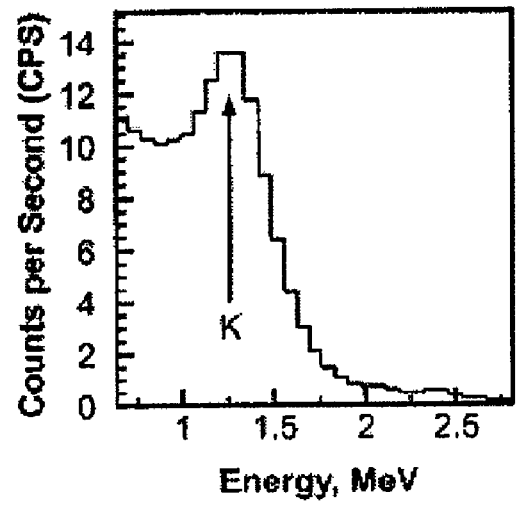
FIG. 1A                FIG. 1B
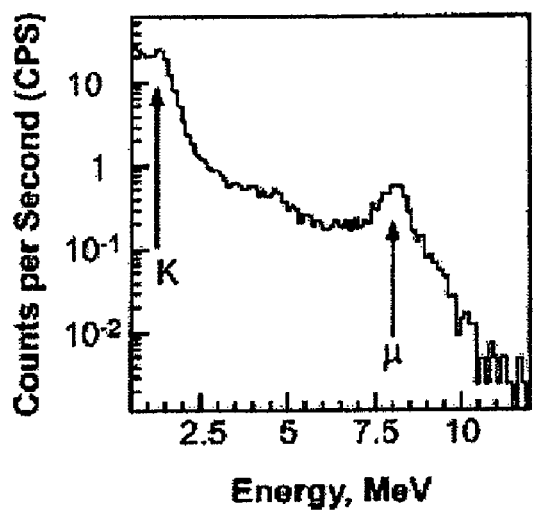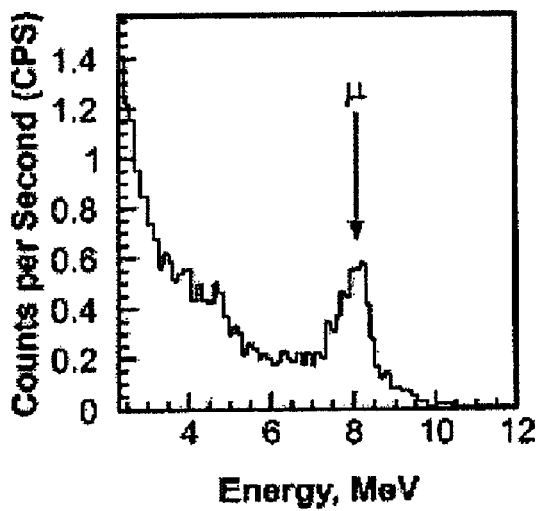
FIG. 1C                FIG. 1D

SCINTILLATION DETECTOR GAIN CONTROL SYSTEM USING REFERENCE RADIATION

BACKGROUND OF INVENTION

1. Field of the Invention

The present disclosure relates generally to a scintillation detector system including a scintillator and photomultiplier tube, and more specifically to a process for automatically controlling gain of a scintillation detector system (SDS).

2. Background Art

A photomultiplier tube (PMT) is a sensitive detecting device used to measure light or convert light into amplified electrical signals. A typical PMT includes an evacuated glass tube and a series of electrodes disposed within the tube. The series of electrodes includes a photocathode from which a light source enters the tube, a focusing electrode, a plurality of dynodes that function as an electron multiplier, and an anode where the multiplied charge accumulates.

When incident photons (incident light) strike the photocathode of the PMT, the photons eject photoelectrons due to the photoelectric effect. The photoelectrons emitted from the photocathode are accelerated by an electric field, and are directed toward the electron multiplier by the focusing electrode. The electron multiplier, i.e., the series of dynodes, multiplies the photoelectrons by process of secondary emission. When the multiplied photoelectrons reach the anode, they are output as an electrical signal.

More specifically, when the accelerated photoelectrons strike the first dynode, secondary electrons are emitted through secondary emission. These secondary electrons join the first batch of photoelectrons and are accelerated toward the next dynode. This process is repeated over successive dynodes. This cascade effect of secondary emission results in an increasing number of electrons produced at each successive dynode. In other words, charge is amplified at each successive dynode. When the electrons reach the anode, they are output as an amplified electrical signal. As a result of the above process, even a small photoelectric current from the photocathode can provide a large output current at the anode of the PMT. The amplification depends on the number of dynodes, accelerating voltage, temperature, etc.

PMTs are commonly used in scintillation counters (or scintillation detectors) to measure ionizing radiation given off by radiation sources. A scintillation counter is constructed by coupling a PMT to a scintillator. The scintillator produces light when excited by ionizing radiation. The PMT detects and absorbs the light emitted by the scintillator, and, through the process described above, remits the light in the form of amplified electrical output pulses. These pulses may be counted by, e.g., an electronic counter. By analyzing these output pulses, a pulse distribution or energy spectrum may be obtained. Distinct peaks at each energy level can be evaluated as pulse height resolution.

PMTs provide advantages such as high internal gain, high sensitivity, fast responses, low noise, and a high frequency response. However, stability of the gain in the output signal of the PMT may fluctuate due to various factors such as temperature, aging rate of the PMT or scintillator, fluctuations in power supply, material of the photocathode, etc.

SUMMARY OF INVENTION

In general, in one aspect, the present disclosure relates to a method for controlling gain of a scintillation detector, the method including using a reference radiation source and a photomultiplier tube and controlling the gain of the scintillation detector based on the reference radiation source. The controlling includes detecting change in the gain of the scintillation detector, determining an amount of the change in the gain, outputting a control signal to compensate the amount of the change in the gain, and stabilizing the gain against the reference radiation source based on the control signal.

In general, in another aspect, the present disclosure relates to a gain control system for controlling gain of a scintillation detector, the system including computer-readable instructions stored in the memory for causing the processor to detect change in the gain of the scintillation detector, determine an amount of the change in the gain, output a control signal to compensate the amount of the change in the gain, and stabilize the gain against the reference radiation source based on the control signal.

Other aspects and advantages of the disclosure will be apparent from the following description and the appended claims.

BRIEF DESCRIPTION OF DRAWINGS

FIG. 1A shows a graphical illustration of an example reference Cesium source.

FIG. 1B shows a graphical illustration of an example reference Potassium source.

FIG. 1C shows a graphical illustration of an example reference Americium-beryllium source.

FIG. 1D shows a graphical illustration of an example reference cosmic ray source.

DETAILED DESCRIPTION

Figure 2:
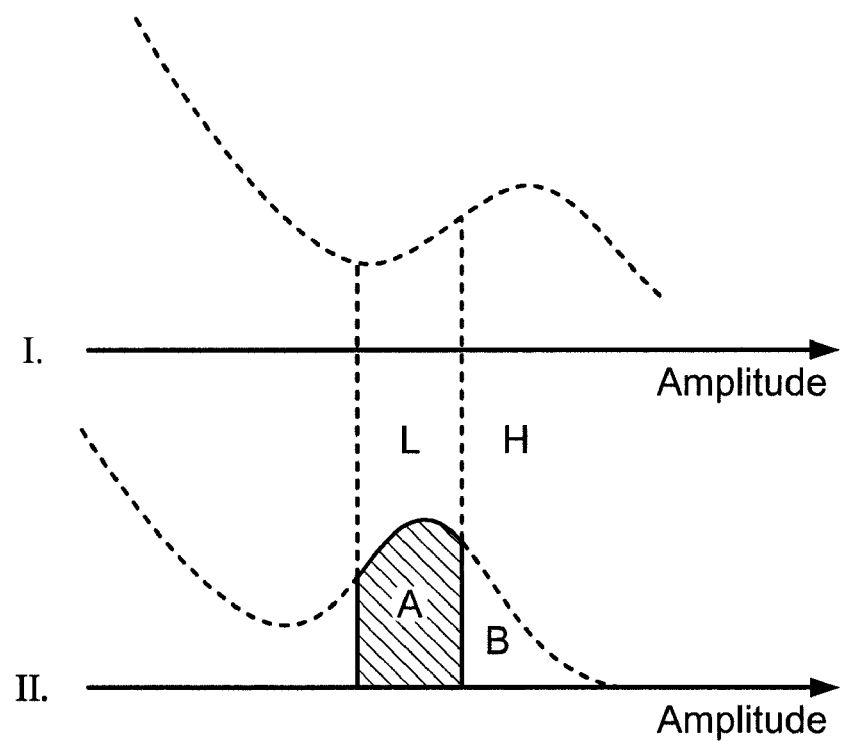
FIG. 2 shows a pulse height spectrum at nominal gain and a pulse height spectrum at shifted gain in accordance with one or more embodiments of the present disclosure.

Specific embodiments of the present disclosure will be described with reference to the accompanying figures. In the following detailed description of embodiments, numerous specific details are set forth in order to provide a more thorough understanding of the disclosure. However, it will be apparent to one of ordinary skill in the art that the present disclosure may be practiced without these specific details. In other instances, well-known features have not been described in detail to avoid obscuring the disclosure.

In general, whenever a certain amount of energy is deposited in a scintillator of a scintillation counter, the scintillator produces light and a PMT coupled to the scintillator converts the light into an electrical signal through photoelectric effect and secondary emission. The electrical signal is then output at the anode of the PMT as a pulse having a certain height (or amplitude). The conversion factor between the input energy and the output pulse height may be defined as the gain. One or more embodiments of the present disclosure controls and stabilizes this gain, which may fluctuate due to factors such as temperature, aging rate of the PMT or scintillator, scintillation efficiency, optical contact between the PMT and the scintillator, etc.

In one or more embodiments, a gain control process stabilizes the gain against a known reference, e.g., a source of gamma-ray emission or ionizing radiation of known energy that deposits substantially the same input energy in the PMT of the scintillation counter (or a similar detector). The reference source may be located, for example, on a surface of the scintillator. Using this reference source, the gain control process in accordance with one or more embodiments compensates fluctuations in PMT gain. Examples of reference radiation sources that may be used include cesium sources (Cs), potassium sources (K), americium-beryllium sources (AmBe), and cosmic rays. These four sources are illustrated graphically in FIGS. 1A-D, but it will be evident to those skilled in the art that the scope of the present disclosure is not limited to any particular source of gamma-ray emission. The x-axis of FIGS. 1A and 1B represent the energy of gamma-quants, the x-axis of FIG. 1C represents the energy of both gamma-quants and cosmic rays, and the x-axis of FIG. 1C represents the energy of cosmic rays and the y-axis FIGS. 1A-1C represents the number of gamma-quants and cosmic rays having a certain energy level (amplitude), in counts per second (cps). As shown in FIGS. 1A-D, each of the sources exhibits a clear peak, which can be used as a reference point. By monitoring change in the peak position in the amplitude spectrum of the reference radiation source, the gain control process in accordance with one or more embodiments can detect the changes in the peak position and compensate for changes in the gain, i.e., bring the peak back to its original or "normal" position.

A reference source may be the same as the main source, a separate small source or cosmic ray. However, in some applications like Back Scattering, the energy spectrum depends on the process which makes it impossible to use the main source as a reference. In this case, usually, a reference source has less gamma-ray flux than a main input source, but emits gamma quants with higher energy. Because a scintillator's light flash intensity depends on gamma-quant energy, a shift in energy between the main source and the reference source enables separation of the reference source signal from the PMT's total output signal. By extracting the reference source signal ("reference peak") from the total output signal, the PMT high voltage supply can be adjusted so as to keep the reference signal constant, notwithstanding any external factors.

In a detector such as a scintillation counter, for example, each gamma-quant that hits the scintillator produces a flash of light with an intensity that correlates with the gamma-quant energy. The PMT converts this light flash into an electrical pulse. The flash intensity and the PMT yield determine the amplitude of this pulse. Keeping the gain constant means that a constant level of energy deposited in the scintillator results in PMT electrical pulses of the same amplitude, notwithstanding external or environmental factors that may have affected detector sensitivity.

As described above, gain may be defined as a proportionality coefficient between the input energy and the output PMT pulse amplitude. In one or more embodiments, if the pulse amplitude increases above a certain upper threshold for any reason, the gain control process decreases the PMT high voltage to bring the pulse amplitude back to normal; on the other hand, if the pulse amplitude falls below a certain lower threshold, the gain control process increases the high voltage to bring the pulse amplitude back to normal. In this way, the gain control system may react to the change in the gain, irrespective of the particular cause of that change.

More specifically, in one or more embodiments, stabilization of the gain may be achieved by defining thresholds that represent counting rates in separate bands (or ranges), calculating a ratio between the bands, and changing the PMT supply voltage to compensate the gain changes. To illustrate, for example, in FIG. 2, two pulse height spectrums are shown along with two bands, Low (L) and High (H). Spectrum I shows a pulse height spectrum at shifted gain, and spectrum II shows a pulse height spectrum at nominal gain. The two vertical lines may represent hardwired thresholds that define the L- and H-bands. The lower threshold may be selected so as to eliminate unwanted noise. Graphically, this means that pulses with an amplitude that fall to the left of the lower threshold (pulses having an amplitude less than the lower threshold) are considered noise, and therefore are not taken into account.

In one or more embodiments, the gain control process counts electrical pulses generated within the L-band, i.e., between the two hardwired thresholds, and electrical pulses generated within the H-band, i.e., above the upper threshold. In other words, the gain control process counts the number of pulses from the PMT with an amplitude greater than the lower threshold but less than the upper threshold, i.e., the number of pulses in zone A of FIG. 2, and counts the number of pulses from the PMT with an amplitude greater than the upper threshold, i.e., the number of pulses in zone B of FIG. 2. The values of the threshold may be selected such that, under "normal" conditions, i.e., conditions in which the detector sensitivity is unaffected by external or environmental factors, the total number of electrical pulses with amplitudes in zone A is equal to the total number of electrical pulses with amplitudes in zone B.

If for any reason the detector sensitivity changes, the amplitude of the electrical pulses output from the PMT also changes. For example, if the PMT gain increases, the amplitude of the electrical pulses also increases. Referring to FIG. 2 by way of example, this means that the peak of the height spectrum I will shift to the right, toward the higher amplitudes. Consequently, the number of pulses with amplitudes in zones A and B will change. Specifically, the number of pulses in zone A will decrease, and the number of pulses in zone B will increase (in other words, the H/L ratio increases, as can be seen by comparing the top and bottom pulse height spectrums in FIG. 2). In one or more embodiments, to return the gain (or detector sensitivity) to normal, the gain control process decreases the PMT high voltage until the number of pulses in zone A becomes equal to the number of pulses in zone B. This brings the gain back to its "normal" value, or equilibrium point.

On the other hand, if the PMT gain decreases, the amplitude of the electrical pulses also decreases. Referring to FIG. 2 by way of example, this means that the peak of the height spectrum I will shift to the left, toward the lower amplitudes. Consequently, the number of pulses with amplitudes in zones A and B will change. Specifically, the number of pulses in zone A will increase, and the number of pulses in zone B will decrease (in other words, the H/L ratio decreases, as can be seen by comparing the top and bottom pulse height spectrums in FIG. 2). In one or more embodiments, to return the gain (or detector sensitivity) to normal, the gain control process increases the PMT high voltage until the number of pulses in zone A becomes equal to the number of pulses in zone B. This brings the gain back to its "normal" value, or equilibrium point.

As described above, the H/L ratio increases when the gain increases, and decreases when the gain decreases. Hence, in one or more embodiments, the gain control process detects the increase/decrease in the H/L ratio, and, in response, generates a control signal to decrease/increase the PMT supply voltage. Referring to FIG. 2 by way of example, this means equalizing the areas of the L- and H-bands under the curve (represented by zones A and B). When the area of zone A is substantially equal to the area of zone B, that indicates the number of pulse counts in the L-band has become substantially equal to the number of pulse counts in the H-band, and the gain is constant.

Figure 3:
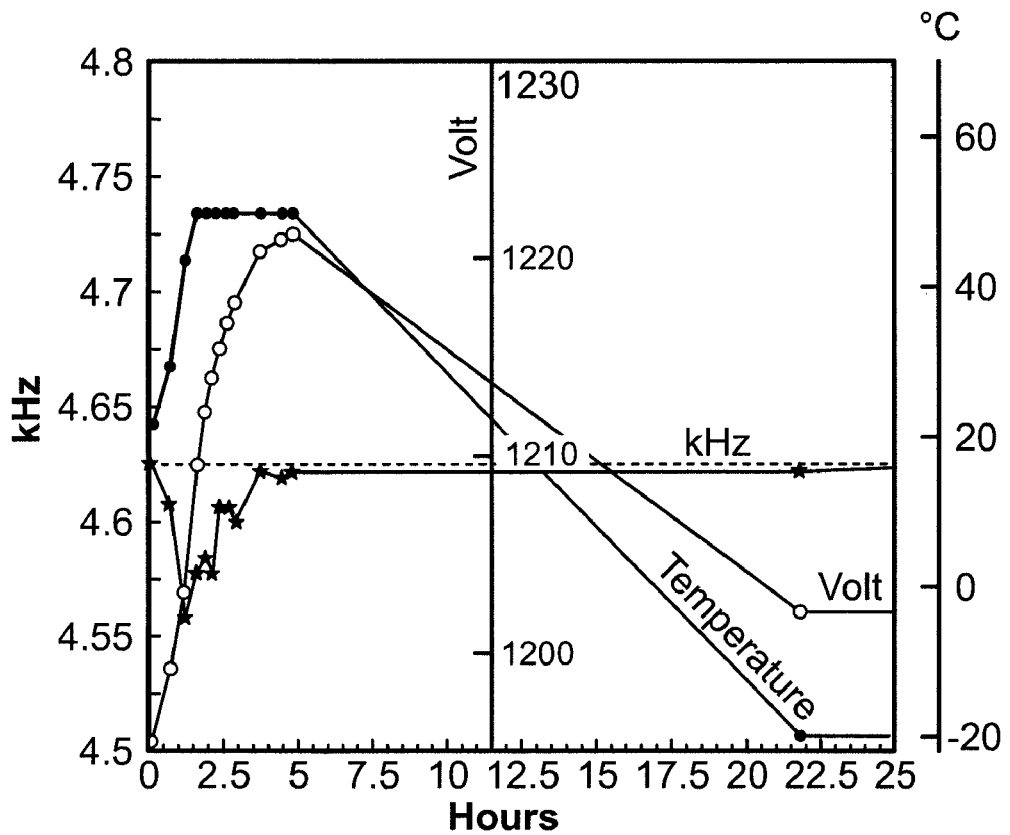
FIG. 3 shows a graphical illustration of an experiment conducted in accordance with one or more embodiments of the present disclosure.

For experimentation purposes, the counting rate of a scintillation counter from a radiation source (in this case 1 μCi of Cesium) was monitored in an environmental chamber. The results are illustrated graphically in FIG. 3. The graph displays the temperature, PMT supply voltage, and counting rate evolution over time. In this experiment, the counting rate was defined as the number of pulses above a certain threshold produced by the radiation source. The temperature in the environmental chamber was varied to monitor the change in PMT gain. As expected, changing the temperature affected both the gain and the scintillator light yield. Then, in accordance with one or more embodiments, the gain control process generated a control signal and changed the PMT supply voltage based on the temperature change so as to keep the counting rate constant. As a result, as shown in FIG. 3, the gain control process effectively stabilized the counting rate at approximately 4.635 kHz.

Figure 4A:
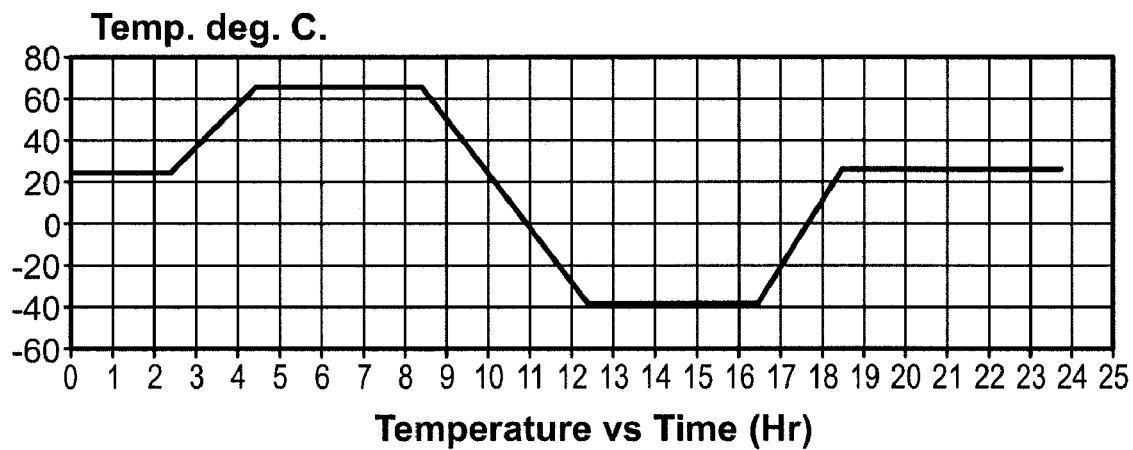
FIG. 4A shows a temperature versus time graph of an experiment conducted in accordance with more or more embodiments of the present disclosure.
Figure 4B:
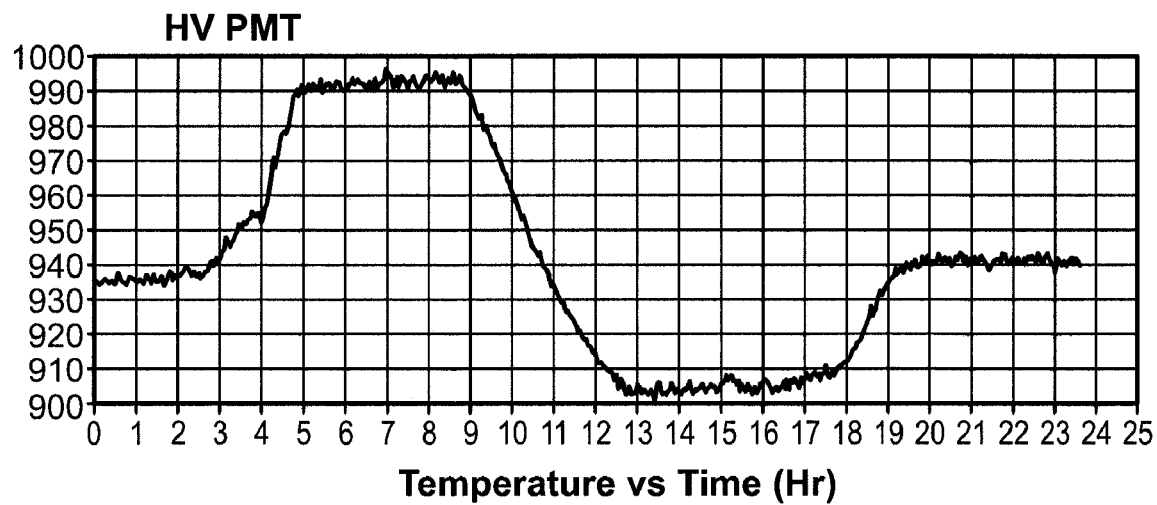
FIG. 4B shows a high voltage versus time graph of the experiment of FIG. 4A.
Figure 4C:
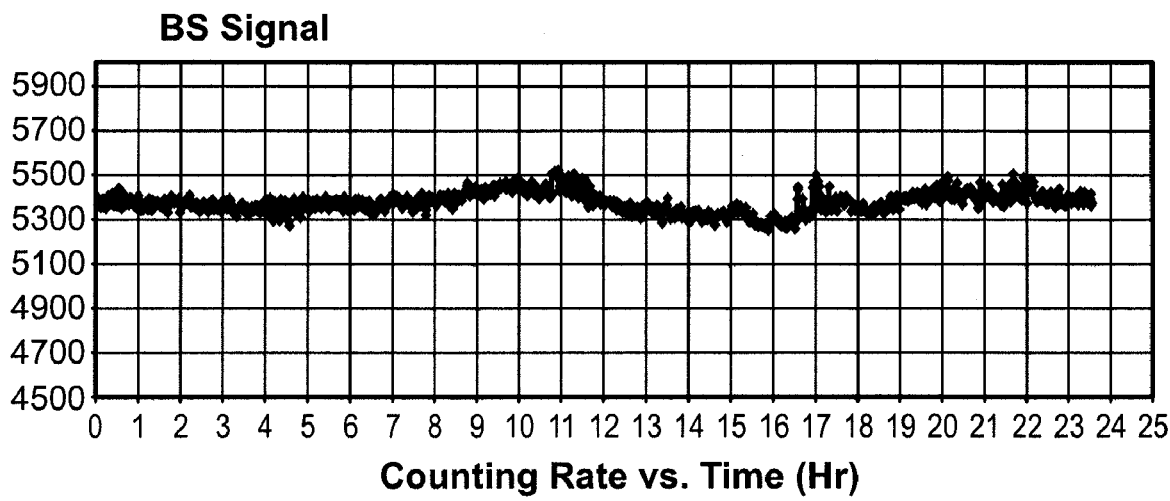
FIG. 4C shows a counting rate versus time graph of the experiment of FIG. 4A

Results of another experiment are shown in FIGS. 4A-C. FIG. 4A shows a graph of PMT temperature over time, FIG. 4B shows PMT supply voltage over time, and FIG. 4C shows PMT counting rate over time. Again, changing the temperature affected both the PMT gain and the scintillator light yield. As can be seen in FIG. 4B, in accordance with one or more embodiments, the gain control process changed the PMT supply voltage so as to keep the gain constant. The counting rate shown in FIG. 4C indicates the number of pulses above a certain threshold produced by the reference radiation source. The counting rate can be used as a measure of stability because increased gain results in more pulses over the defined threshold, and decreased gain results in less pulses.

Further, one or more embodiments of the gain control process may be adaptive such that the process reacts differently based on certain criteria. For example, the gain control process can be configured to react more quickly if the gain is far from the equilibrium point, and react more slowly if the gain is near the equilibrium point. In one or more embodiments, a divider may be used to achieve the adaptive gain control process. The level of adaptability or the reaction speed of the gain control process may vary depending on the level of the divider.

For illustration purposes, an example of the adaptive gain control process with a divider (in this case, a divider with four levels) will be explained with reference to FIG. 2. In one or more embodiments, the divider may divide the number of pulses from zones A and B as follows: on level 4, every other electric pulse in zone A increases the PMT high voltage and every other electric pulse in zone B decreases the PMT high voltage; on level 3, every fourth electric pulse in zone A increases the PMT high voltage and every fourth electric pulse in zone B decreases the PMT high voltage; on level 2, every eighth electric pulse in zone A increases the PMT high voltage and every eighth electric pulse in zone B decreases the PMT high voltage; and on level 1, every thirty-second electric pulse in zone A increases the PMT high voltage and every thirty-second electric pulse in zone B decreases the PMT high voltage. It will be evident to those skilled in the art that the number of levels may vary based on the desired degree of control and flexibility.

According to one or more embodiments, level 4 provides the fastest reaction speed, but the lowest stability of control. On the other hand, level 1 provides the highest stability of control, but has the slowest reaction speed. Levels 2 and 3 have a degree of reaction speed and stability between levels 1 and 4. In this way, the adaptive gain control process in accordance with one or more embodiments can react adaptively, i.e., react more quickly when the gain is far from the equilibrium point and more slowly when the gain is near the equilibrium point. For example, referring to FIG. 2, if the number of pulses in zone A and the number of pulses in zone B are nearly equal, divider level 1 may be used because the gain is already near equilibrium, and therefore fast reaction time is not imperative. On the other hand, if the number of pulses in zone A and the number of pulses in zone B are significantly different (meaning the gain is far from the equilibrium point), then divider level 4 may be used so that the gain can be returned to the equilibrium point more quickly.

Figure 6A:
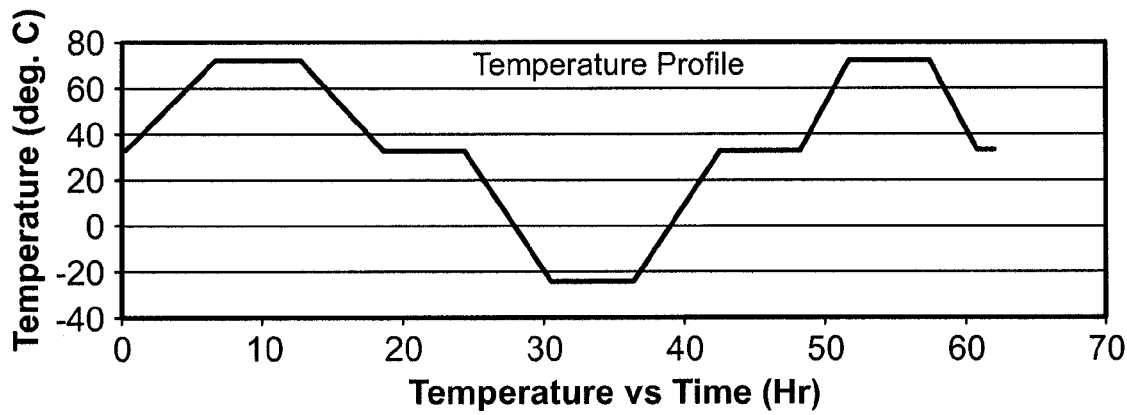
FIG. 6A shows a temperature versus time graph of an experiment conducted in accordance with one or more embodiments of the present disclosure.
Figure 6B:
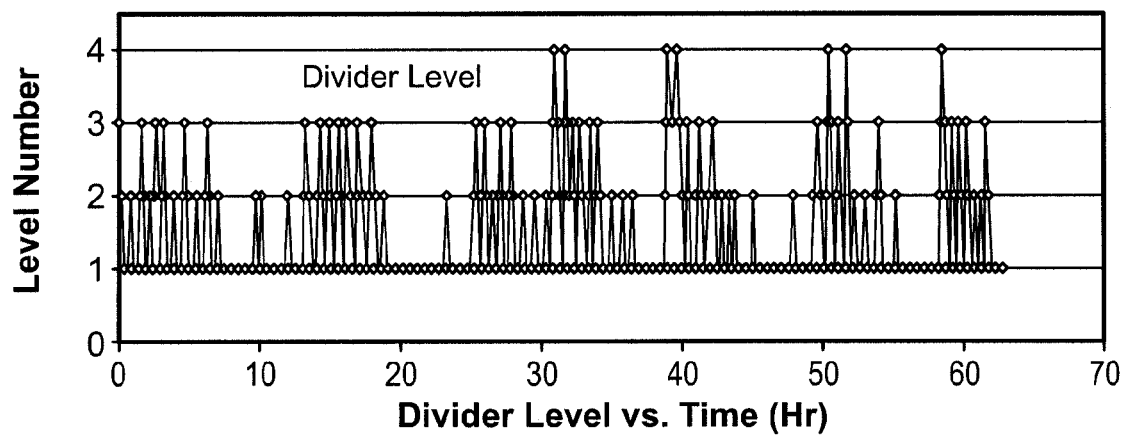
FIG. 6B shows a divider level versus time graph of the experiment of FIG. 6A.
Figure 6C:
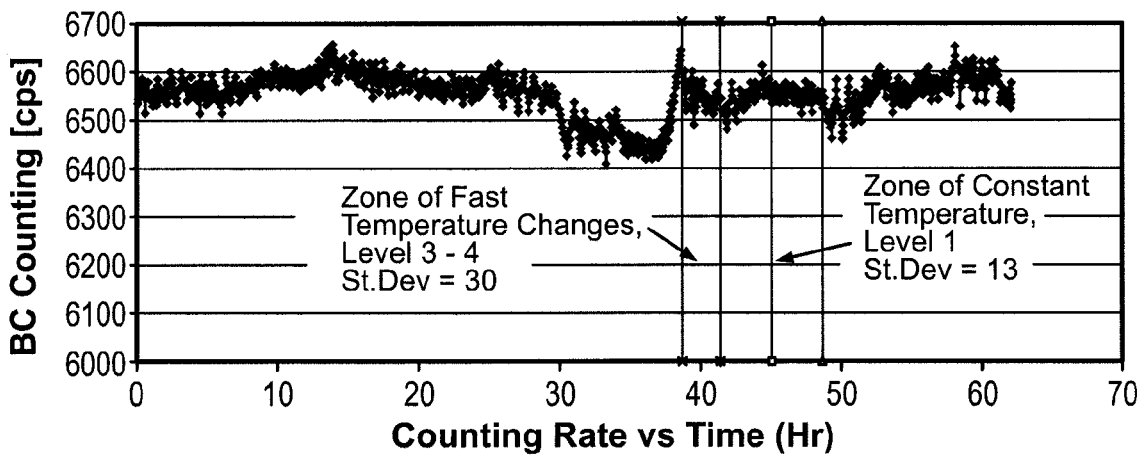
FIG. 6C shows a counting rate versus time graph of the experiment of FIG. 6A

Experimental results of the 4-level divider in accordance with one or more embodiments are graphically illustrated in FIGS. 6A-C. FIG. 6A shows a graph of PMT temperature over time, FIG. 6B shows divider level over time, and FIG. 6C shows PMT counting rate over time. Changing the temperature affected both the PMT gain and the scintillator light yield. As can be seen in FIG. 6B, in accordance with one or more embodiments, the gain control process used different divider levels based on the change in gain. The counting rate shown in FIG. 6C indicates the number of pulses above a certain threshold produced by a reference radiation source. FIG. 6C also indicates that, in a zone of fast temperature changes, divider level 3 or 4 was used because the deviation in the counting rate was high, and in a zone of relatively constant temperature, divider level 1 was used because the standard deviation in the counting rate was low.

In other embodiments, instead of having distinct levels as described above, the adaptive gain control process may be made continuously variable. This may be achieved by means of a non-linear feedback, for example, in which the control signal (high voltage adjustment) increases faster than the difference between the counting rates of zones A and B.

Those skilled in the art will appreciate that one or more embodiments of the gain control process may be implemented without the aforementioned details. For example, reference radiation sources other than Cs, K, AmBe, or cosmic rays may also be used. Further, the type of the reference source may be selected based on the needs of a particular circumstance or application. For example, if high energy deposition is desired, which makes it easier to separate the reference signals from noise, cosmic rays may be used (cosmic rays can also reduce implementation costs, because they are a natural source of ionizing radiation). Alternatively, if a faster response time is desired, sources such as K or AmBe may be used instead.

Figure 5:
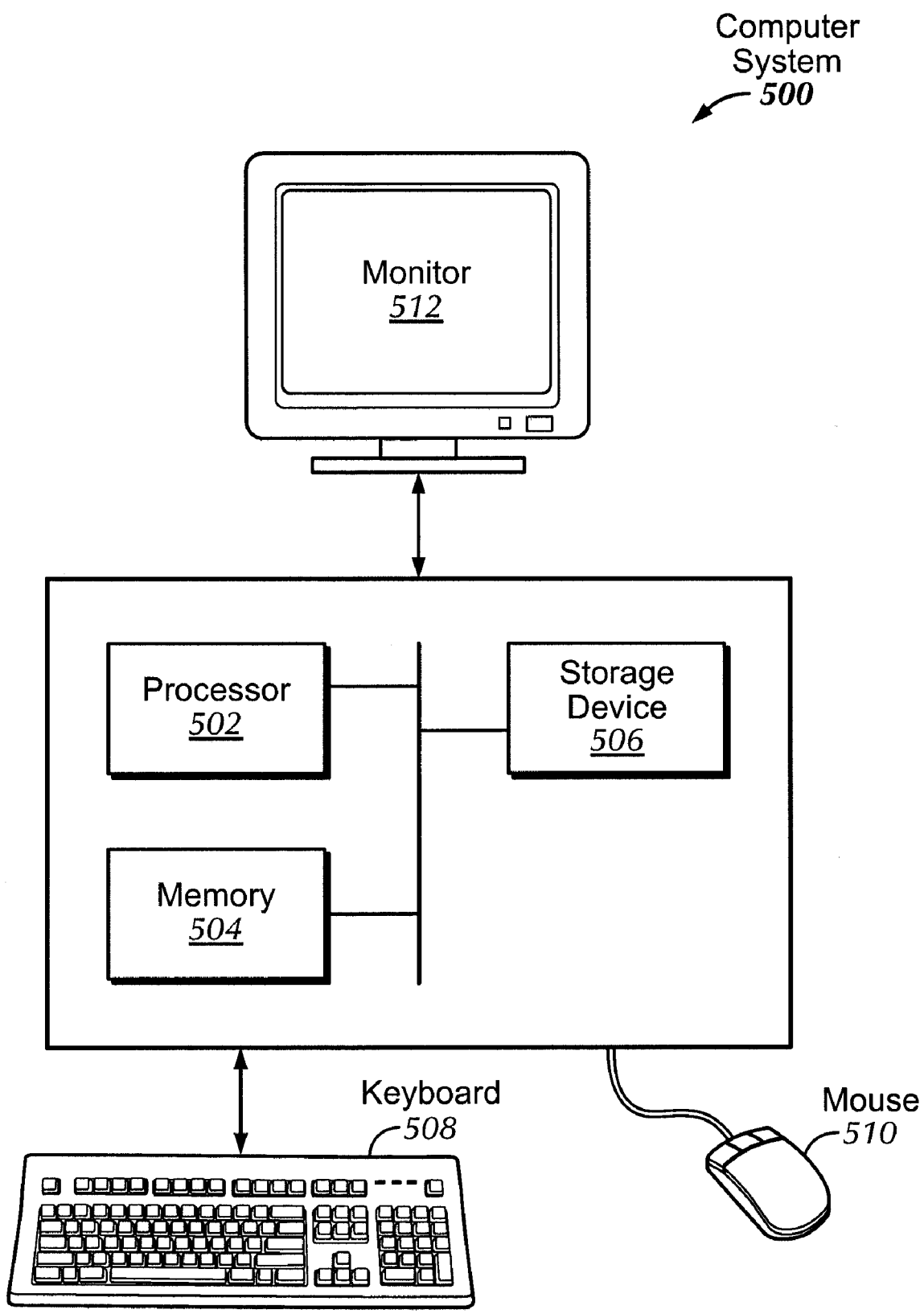
FIG. 5 shows a gain control system in accordance with one or more embodiments of the present disclosure.

Further, one or more embodiments of the gain control process may be implemented on any type of computer system as a PMT gain control system. For example, as shown in FIG. 5, a gain control system 500 includes a processor 502, associated memory 504, a storage device 506, and numerous other elements and functionalities typical of today's computers (not shown). The memory 504 may include instructions for causing the gain control system 500 to perform a PMT gain control process in accordance with one or more embodiments of the present disclosure.

The gain control system 500 may also include input means, such as a keyboard 508 and a mouse 510, and output means, such as a monitor 512. The gain control system 500 may be connected to a local area network (LAN) or a wide area network (e.g., the Internet) (not shown) via a network interface connection (not shown). Those skilled in the art will appreciate that these input and output means may take other forms, now known or later developed.

Further, those skilled in the art will appreciate that one or more elements of the gain control system 500 may be located at a remote location and connected to the other elements over a network. Further, one or more embodiments may be implemented on a distributed system having a plurality of nodes, where each portion of the invention (e.g., intrusion detection system, response rewriter, server, client) may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions to perform embodiments of the invention may be stored on a tangible computer readable medium such as a digital video disc (DVD), compact disc (CD), a diskette, a tape, or any other suitable tangible computer-readable storage device.

Advantages of embodiments of the present disclosure may include one or more of the following. One or more embodiments of the present disclosure can effectively control the sensitivity (or gain) of a PMT detector, e.g., scintillation counter, so that the sensitivity remains relatively constant notwithstanding the presence of external or environmental factors such as temperature, aging rate of the PMT or scintillator, scintillation efficiency, optical contact between the PMT and the scintillator, etc. Effectively maintaining the sensitivity of the detector enables the PMT detector to obtain measurements with better accuracy. Further, those skilled in the art will appreciate that embodiments of the present disclosure can be implemented in various environments or applications. For example, one or more embodiments of the present disclosure may be used to obtain accurate measurements from a PMT detector configured to measure physical parameters (such as density) of crude oil or refinery liquid.

Although the disclosure has been described with respect to only a limited number of embodiments, those skilled in the art, having benefit of this disclosure, will appreciate that other embodiments can be devised which do not depart from the scope of the present disclosure. Accordingly, the scope of the present disclosure should be limited only by the attached claims.

What is claimed is:

1. A method for controlling gain of a scintillation detector, the method comprising:
   using a reference radiation source and a photomultiplier tube; and
   controlling the gain of the scintillation detector based on the reference radiation source, the controlling comprising:
      detecting change in the gain of the scintillation detector;
      determining an amount of the change in the gain;
      outputting a control signal to compensate the amount of change in the gain, wherein the control signal stabilizes the gain against the reference radiation source by:
         changing the gain of the photomultiplier tube by a first amount at a first rate, wherein the first rate is proportional to a counting rate within a low band of a pulse height spectrum;
         changing the gain of the photomultiplier tube by a second amount at a second rate, wherein the second rate is proportional to a counting rate within a high band of a pulse height spectrum.

2. The method according to claim 1, wherein the reference source is a source of ionizing radiation that deposits substantially a same amount of energy into the scintillation detector.

3. The method according to claim 1, wherein the gain is a proportionality coefficient between energy deposited in the scintillation detector and an output of the photomultiplier tube.

4. The method according to claim 3, wherein the detecting comprises extracting a reference source signal of the reference radiation source from the output of the photomultiplier tube.

5. The method according to claim 4, wherein the detecting further comprises:
   generating the pulse height spectrum of the photomultiplier tube at nominal gain;
   defining the low band and the high band of the pulse height spectrum;
   counting electrical pulses outputted by the photomultiplier tube within the low-band of the pulse height spectrum;
   counting electrical pulses outputted by the photomultiplier tube within the high-band of the pulse height spectrum;
   calculating a nominal ratio of the high-band pulses to the low-band pulses; and
   monitoring a change in the nominal ratio.

6. The method according to claim 5, wherein the determining comprises:
   generating a pulse height spectrum of new gain when a change in the nominal ratio is detected; and
   calculating an amount of change between the nominal ratio and a new ratio of the high-band pulses to the low-band pulses at the new gain.

7. The method according to claim 6, wherein the control signal increases or decreases the new gain by the calculated amount of change between the nominal ratio and the new ratio such that the new ratio becomes substantially equal to the nominal ratio.

8. The method according to claim 1, wherein changing the gain of the photomultiplier tube comprises varying a high voltage of the photomultiplier tube.

9. The method according to claim 8, wherein the varying comprises:
   increasing the high voltage by the amount of the change in the gain when the gain has decreased; and
   decreasing the high voltage by the amount of the change in the gain when the gain has increased.

10. The method according to claim 1, wherein the first rate and second rate increase as the change in the gain increases and decrease as the change in the gain decreases.

11. The method of claim 1, wherein the reference radiation source comprises cosmic rays.

12. A gain control system for controlling gain of a scintillation detector, the system comprising:
   a memory;
   a processor operatively connected to the memory; and
   computer-readable instructions stored in the memory for causing the processor to control the gain of the scintillation detector based on the reference radiation source, the instructions comprising:
      detecting change in the gain of the scintillation detector;

determining an amount of the change in the gain;

outputting a control signal to compensate the amount of change in the gain, wherein the control signal stabilizes the gain against the reference radiation source by:

changing the gain of the photomultiplier tube a first amount at a first rate by, wherein the first rate is proportional to a counting rate within a low band of a pulse height spectrum; and changing the gain of the photomultiplier tube by a second amount at a second rate, wherein the second rate is proportional to a counting rate within the high band of a pulse height spectrum.

13. The system according to claim 12, wherein the reference source is a source of ionizing radiation that deposits substantially a same amount of energy into the scintillation detector.

14. The system according to claim 12, wherein the gain is a proportionality coefficient between energy deposited in the scintillation detector and an output of a photomultiplier tube.

15. The system according to claim 14, wherein the detecting comprises extracting a reference source signal of the reference radiation source from the output of the photomultiplier tube.

16. The system according to claim 15, wherein the detecting further comprises:

generating the pulse height spectrum of the photomultiplier tube at nominal gain;

defining the low band and the high band of the pulse height spectrum;

counting electrical pulses outputted by the photomultiplier tube within the low-band of the pulse height spectrum;

counting electrical pulses outputted by the photomultiplier tube within the high-band of the pulse height spectrum;

calculating a nominal ration of the high-band pulses to the low-band pulses; and monitoring a change in the nominal ratio.

17. The system according to claim 16, wherein the determining comprises:

generating a pulse height spectrum of new gain when a change in the nominal ratio is detected; and calculating an amount of change between the nominal ratio and a new ratio of the high-band pulses to the low-band pulses at the new gain.

18. The system according to claim 17, wherein the control signal increases or decreases the new gain by the calculated amount of change between the nominal ratio and the new ratio such that the new ratio becomes substantially equal to the nominal ratio.

19. The system according to claim 12, wherein the changing the gain of the photomultiplier tube comprises varying a high voltage of a photomultiplier tube.

20. The system according to claim 12, wherein the varying comprises:

increasing the high voltage by the amount of the change in the gain when the gain has decreased; and decreasing the high voltage by the amount of the change in the gain when the gain has increased.

21. The system according to claim 12, wherein the first rate and second rate increase as the change in the gain increases and decrease as the change in the gain decreases.

22. The system of claim 11, wherein the reference radiation source comprises cosmic rays.

\* \* \* \* \*